US010535339B2

(12) United States Patent
Fujimura

(10) Patent No.: US 10,535,339 B2
(45) Date of Patent: Jan. 14, 2020

(54) RECOGNITION RESULT OUTPUT DEVICE, RECOGNITION RESULT OUTPUT METHOD, AND COMPUTER PROGRAM PRODUCT

(71) Applicant: KABUSHIKI KAISHA TOSHIBA, Minato-ku, Tokyo (JP)

(72) Inventor: Hiroshi Fujimura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/182,987

(22) Filed: Jun. 15, 2016

(65) Prior Publication Data

US 2016/0379624 A1 Dec. 29, 2016

(30) Foreign Application Priority Data

Jun. 24, 2015 (JP) .................................. 2015-126246

(51) Int. Cl.
*G10L 15/183* (2013.01)
*G10L 15/01* (2013.01)
*G10L 15/02* (2006.01)

(52) U.S. Cl.
CPC ............ *G10L 15/183* (2013.01); *G10L 15/01* (2013.01); *G10L 2015/025* (2013.01)

(58) Field of Classification Search
CPC .............................. G10L 15/01; G10L 15/183
See application file for complete search history.

(56) References Cited

U.S. PATENT DOCUMENTS

| 7,299,178 B2 | 11/2007 | Yoon et al. |
| 7,454,340 B2 | 11/2008 | Sakai et al. |
| 2002/0055840 A1* | 5/2002 | Yamada ................ G10L 15/063 704/245 |
| 2002/0120448 A1* | 8/2002 | Garner .................... G10L 15/12 704/254 |
| 2006/0085187 A1* | 4/2006 | Barquilla ................ G10L 13/08 704/243 |
| 2006/0195319 A1* | 8/2006 | Prous Blancafort .... G10L 15/18 704/235 |
| 2014/0067391 A1 | 3/2014 | Ganapathiraju et al. |
| 2015/0340034 A1* | 11/2015 | Schalkwyk ............. G10L 15/18 704/235 |
| 2016/0379624 A1* | 12/2016 | Fujimura .............. G10L 15/183 704/235 |

FOREIGN PATENT DOCUMENTS

| JP | 2004-258658 A | 9/2004 |
| JP | 2006-113569 A | 4/2006 |
| JP | 2006-243728 A | 9/2006 |
| JP | 3984207 B2 | 10/2007 |
| JP | 2010-009446 A | 1/2010 |

* cited by examiner

*Primary Examiner* — Samuel G Neway
(74) *Attorney, Agent, or Firm* — Foley & Lardner LLP

(57) ABSTRACT

According to an embodiment, a speech recognition result output device includes a storage and processing circuitry. The storage is configured to store a language model for speech recognition. The processing circuitry is coupled to the storage and configured to acquire a phonetic sequence, convert the phonetic sequence into a phonetic sequence feature vector, convert the phonetic sequence feature vector into graphemes using the language model, and output the graphemes.

12 Claims, 5 Drawing Sheets

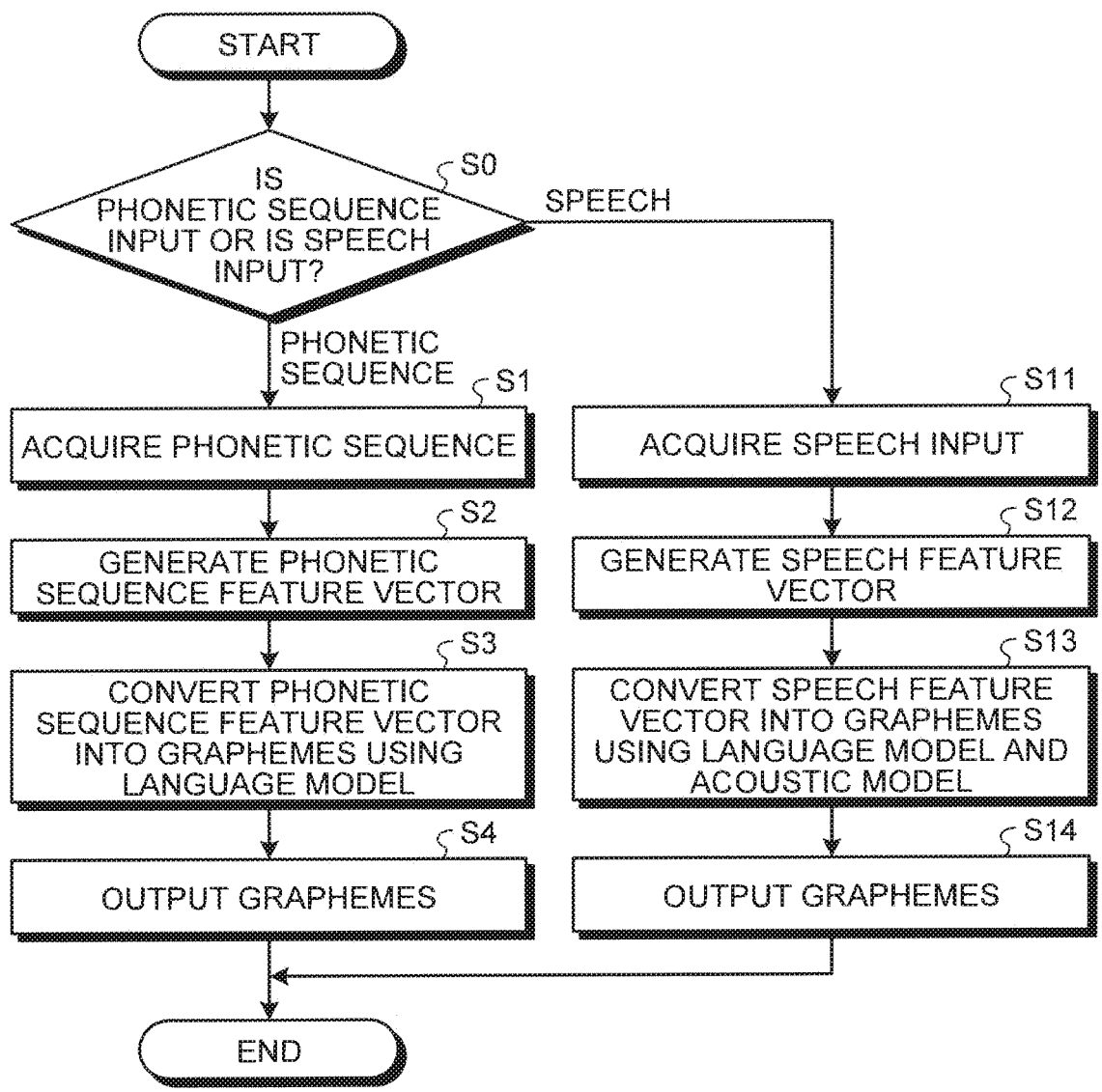

RECOGNITION RESULT OUTPUT DEVICE, RECOGNITION RESULT OUTPUT METHOD, AND COMPUTER PROGRAM PRODUCT

CROSS-REFERENCE TO RELATED APPLICATION

This application is based upon and claims the benefit of priority from japanese Patent Application No 2015-126246, filed on Jun. 24, 2015; the entire contents of which are incorporated herein by reference.

FIELD

Embodiments described herein relate generally to a recognition result output device, a recognition result output method, and a computer program product.

BACKGROUND

In an application that makes use of a speech recognition result obtained by a speech recognition engine, as far as the user or the application developer is concerned, a function which enables learning about the graphemes output by the speech recognition engine with respect to a particular phonetic sequence is important to the developer or the user of the application making use of the speech recognition engine. In practice, there is a method in which a speech is input to the speech recognition engine by uttering some words or sentences, and it is checked whether or not the expected speech recognition result is output. This confirmatory method represents the simplest confirmatory method for the purpose of checking whether or not the expected graphemes are output with respect to the phonetic sequence that was input.

However, in the confirmatory method in which a person actually performs a speech input by means of vocalization and checks the speech recognition result, if the words to be checked are large in number, then the task of checking requires effort and cost. Moreover, if the correct speech recognition result is not output, it is difficult to pinpoint the cause such as whether the language model is responsible or whether the acoustic model is responsible.

A method is known in which, using a language model that is created based on the statistic identical to the language model used in a speech recognition engine, kana characters are input; kana-kanji conversion is performed; and a result identical to the result of the speech recognition engine is obtained. However, in this method, a decoder capable of kana-kanji conversion needs to be provided separately from the existing decoder of the speech recognition engine. That is, a total of two decoders, namely, a "decoder of the speech recognition engine" and a "decoder for kana-kanji conversion" need to be disposed. As a result, the configuration of the speech recognition result output device becomes complex and the cost increases.

BRIEF DESCRIPTION OF THE DRAWINGS

FIG. 7 is a flowchart for explaining a flow of operations performed to convert a phonetic sequence into graphemes and a flow of operations performed to convert an input speech into graphemes in the speech recognition result output device according to the second embodiment.

DETAILED DESCRIPTION

According to an embodiment, a speech recognition result output device includes a storage and processing circuitry. The storage is configured to store a language model for speech recognition. The processing circuitry is coupled to the storage and configured to acquire a phonetic sequence, convert the phonetic sequence into a phonetic sequence feature vector, convert the phonetic sequence feature vector into graphemes using the language model, and output the graphemes.

Exemplary embodiments of a speech recognition result output device are described below in detail with reference to the accompanying drawings.

First Embodiment

Figure 1:
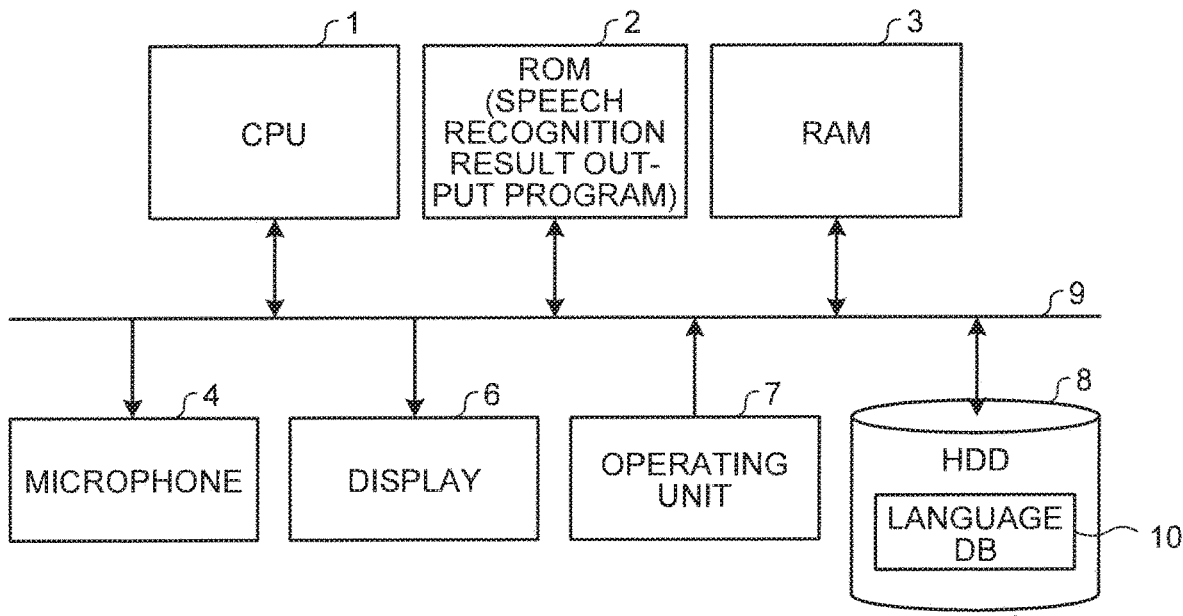
FIG. 1 is a hardware configuration diagram of a speech recognition result output device according to a first embodiment.

To start with, FIG. 1 is a hardware configuration diagram of a speech recognition result output device according to a first embodiment. As illustrated in FIG. 1, the speech recognition result output device includes a CPU 1, a ROM 2, a RAM 3, a microphone 4, a display 6, an operating unit 7, and an HDD 8. The CPU stands for Central Processing Unit. The ROM stands for Read Only Memory. The RAM stands for Random Access Memory. The HDD stands for Hard Disc Drive. The CPU 1 to the HDD 8 are connected to each other via a bus line 9.

The CPU 1 comprehensively controls the operations of the speech recognition result output device. Moreover, the CPU uses the RAM 3 as the work area, and executes a speech recognition result output program that is stored in a storage such as the ROM 2 or the HDD 8 and performs a speech recognition result output operation (described later). The storage such as the HDD 8 is used to store words and phonetic sequence mapping information of the words as well as to store a language model (a language DB) 10 formed by modeling of the concatenation of words. The language model 10 represents an example of a storage.

As far as the language model in the language DB 10 is concerned, a model that is used is created from statistical information identical to statistical information used in a speech recognition engine which outputs the speech recognition result to be checked. Moreover, as the language model, a dictionary in which words and phonetic symbols are associated with each other is also held. As an example, as the language model, an n-gram language model (where n is an integer equal to or greater than 1) can be used that is determined according to the probability of occurrence of every single word of a language model learning data. Herein, as the language model, apart from using a 1-gram language model, it is also possible to use some other language model such as a 2-gram language model, a 3-gram language model, a 4-gram language model, a 5-gram language model, and so on. Alternatively, it is possible to use a language model that is modeled using recurrent neural networks. Still alternatively, it is possible to implement the WFST speech recognition technology (WFST stands for Weighted Finite-State Transducer).

Figure 2:
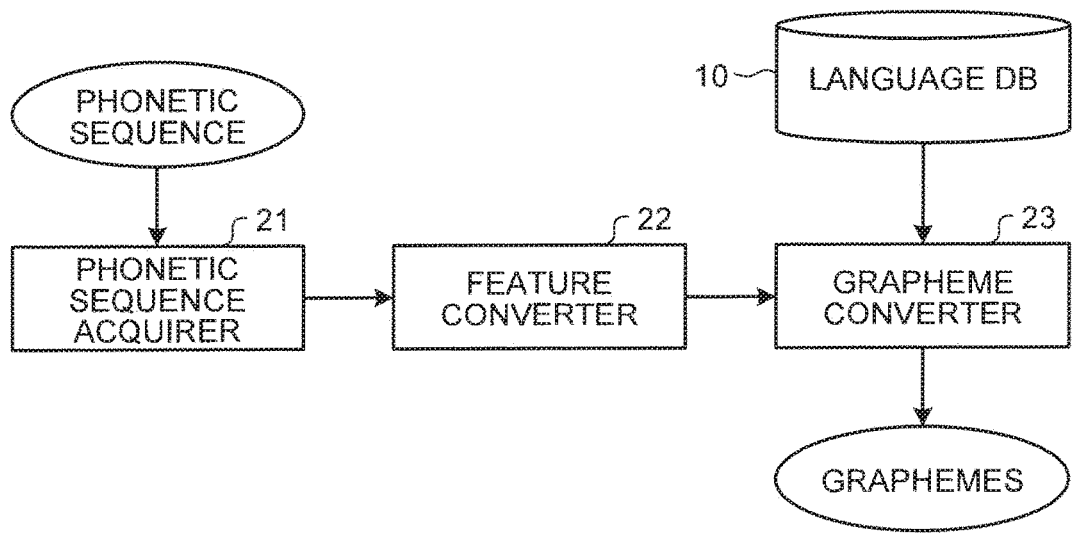
FIG. 2 is a functional block diagram illustrating major functions of the speech recognition result output device according to the first embodiment.

FIG. 2 is a functional block diagram illustrating the functions implemented when the CPU 1 executes the speech recognition result output program stored in the ROM 2. Herein, FIG. 2 is a functional block diagram illustrating major functions. As illustrated in FIG. 2, as a result of executing the speech recognition result output program, the CPU 1 functions as a phonetic sequence acquirer 21, a feature converter 22, and a grapheme converter 23. The CPU 1 is an example of processing circuitry.

Herein, although the phonetic sequence acquirer 21 to the grapheme converter 23 are assumed to be implemented using software, some or all of them can be alternatively implemented using hardware such as an integrated circuit (IC). Meanwhile, the speech recognition result output program can be recorded as an installable file or an executable file in a computer-readable recording medium, which may be provided as a computer program product, such as a compact disk read only memory (CD-ROM) or a flexible disk (FD). Alternatively, the speech recognition result output program can be recorded in a computer-readable recording medium such as a compact disk recordable (CD-R), a DVD, a Blu-ray Disc (registered trademark), or a semiconductor memory. Herein, DVD stands for Digital Versatile Disk. Still alternatively, the speech recognition result output program can be provided via a network such as the Internet. Then, the speech recognition result output program can be downloaded via the network, and can be installed in the speech recognition result output device or a personal computer device. Still alternatively, the speech recognition result output program can be stored in advance in an in-device ROM.

The phonetic sequence acquirer 21 acquires a phonetic sequence and sends it to the feature converter 22. Then, the feature converter 22 generates, from the phonetic sequence, a phonetic sequence feature vector that represents the correct phonetic sequence serving as the speech recognition result in the grapheme converter 23, which is disposed at the subsequent stage. Then, the grapheme converter 23 uses the language model stored in the language DB 10 in the HDD 8; converts the phonetic sequence feature vector into graphemes; and outputs the graphemes.

Figure 3:
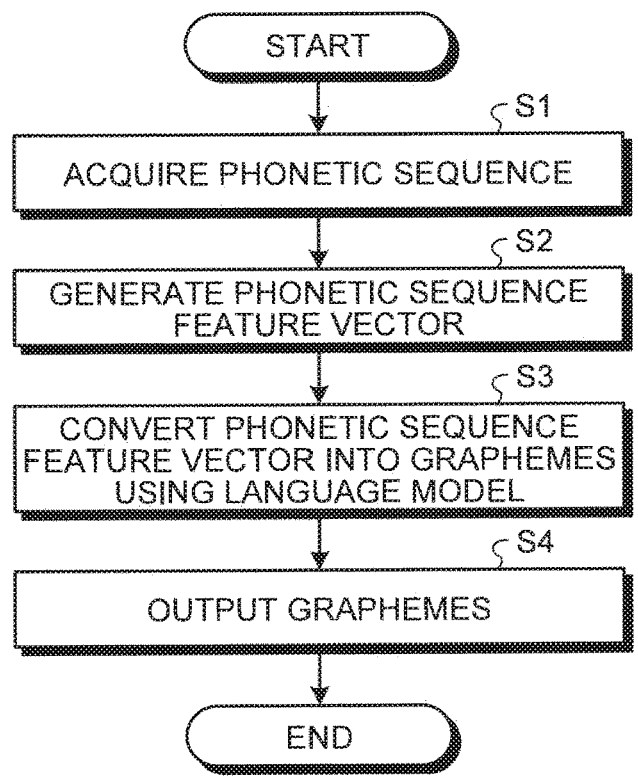
FIG. 3 is a flowchart for explaining a flow of operations performed to convert a phonetic sequence into graphemes in the speech recognition result output device according to the first embodiment.

FIG. 3 is a flowchart for explaining a flow of operations performed during a speech recognition result output operation. At Step S1, the phonetic sequence acquirer 21 acquires the phonetic sequence that is input. Herein, the phonetic sequence can be directly input by the developer or the user by operating a keyboard. Alternatively, grapheme-to-phoneme conversion can be performed in advance, and an estimation result regarding pronunciations or phonemes from the graphemes can be used as the phonetic sequence to be input.

Then, at Step S2, the feature converter 22 generates a phonetic sequence feature vector from the acquired phonetic sequence. The phonetic sequence feature vector is a feature vector representing a correct phonetic sequence in the grapheme converter 23 disposed at the subsequent stage. In a DNN-HMM speech recognition engine in which a deep neural network (DNN) and a hidden Markov model (HMM) are used, a speech section is clipped into single frames at regular time intervals. Moreover, with respect to each clipped frame, a phoneme state output probability vector (a phoneme state acoustic score vector) using the DNN. Then, the speech recognition result output operation is performed using the phoneme state output probability vector.

When 26 phonetic symbols from "a" to "z" are present and when each pronunciation is expressed using a 3-state HMM, a phoneme state output probability vector regarding a 26×3 class is calculated in each frame. Then, the phoneme state output probability vector regarding the 26×3 class is output.

For example, as illustrated in FTG. 4, assume that "b", "r", "e", "i", and "k" that are defined in advance as the phonetic symbols for "break" and "brake" are input by the user. Moreover, assume that the state sequence of "b", "r", "e", "i", and "k" is expressed as "b1", "b2", "b3", "r1", "r3", "e1", "e2", "e3", "i1", "i2", "i3", "k1", and "k3". In that case, as the output probability vector for the first frame, the feature converter 22 creates an output probability vector in which the output probability of "b1" is 1.0 but the other output probabilities are 0.0. As the output probability vector for the second frame, the feature converter 22 creates an output probability vector in which the output probability of "b2" is 1.0 but the other output probabilities are 0.0. As the output probability vector for the third frame, the feature converter 22 creates an output probability vector in which the output probability of "b3" is 1.0 but the other output probabilities are 0.0.

Figure 4:
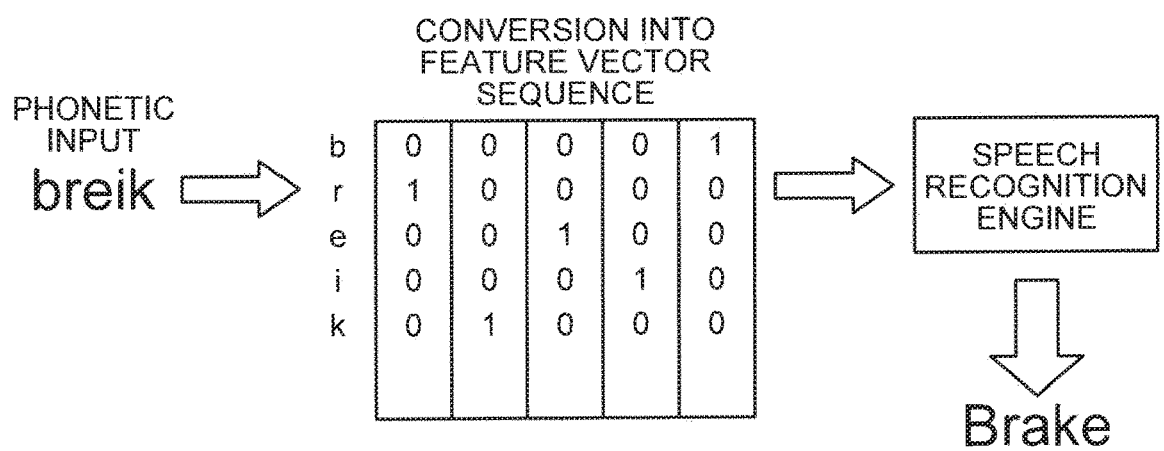
FIG. 4 is a schematic diagram for explaining an operation for converting a phonetic sequence into a phonetic sequence feature vector in the speech recognition result output device according to the first embodiment.

That is, with respect to the states sequence expressing "b", "r", "e", "i", and "k" as illustrated in FIG. 4, the feature converter 22 sequentially creates output probability vectors in each of which the output probability element of the corresponding state is 1.0 and other elements are 0.0. When the output probability vector sequence is supplied to a general-purpose DNN-HMM that does not have the acoustic score calculation function, the phonetic sequence "b", "r", "e", "i", and "k" happens to have the highest likelihood. If the utterance sequence same as the input is present in the word dictionary, then the output of the DNN-HMM decoder is same as the input as far as the phonetic sequence is concerned, and is determined depending on the language model as far as the graphemes are concerned. The feature converter 22 creates such a feature vector and sends it to the grapheme converter 23. When the feature vector is input to the decoder not having the acoustic score calculation function, during the conversion of the graphemes, functions can be shared with the decoder meant for a DNN-HMM speech recognition engine.

Meanwhile, the method of creating a correct vector is not limited to the method explained above. Alternatively, instead of outputting the output probability, the output can be such that the element of the concerned state is set to 10.0 and the other elements are set to 5.0. Still alternatively, the configuration can be such that a noise is added to the correct vector, and it is determined whether or not the desired result is output under stricter conditions. Still alternatively, in HMM speech recognition performed using a Gaussian mixture model (GMM), a vector in which the average value of a plurality of dimensions of the GMM representing each phonetic sequence state is considered as the phonetic sequence feature vector. However, in this case, during grapheme conversion, a language model and an acoustic model for the GMM-HMM speech recognition engine are used.

Subsequently, at Step S3, the grapheme converter 23 convert the phonetic sequence feature vector into graphemes using the language model stored in the language DB 10. As tar as the conversion from a phonetic sequence to graphemes is concerned, it is possible to implement the Viterbi algorithm in which the 1-gram occurrence probability is used. However, the search algorithm is not limited to the Viterbi algorithm. Alternatively, it is possible to use some other algorithm such as the tree trellis search algorithm.

When the phone, c sequence "b" "r", "e", "i", and "k" is expressed with some kind of concatenation words; at Step S4, the grapheme converter 23 outputs the result of the path having the highest likelihood, which is calculated using the Viterbi algorithm, from among the concatenation words or from either one of "break" and "brake". The graphemes output from the grapheme converter 23 are sent to, for example, the display 6 and are displayed thereon. The user who wishes to check the recognition result looks at the graphemes displayed on the display 6, and determines whether or not correct graphemes are output with respect to the phonetic sequence input to the speech recognition result output device according to the first embodiment.

As is from the explanation given above, in the speech recognition device output device according to the first embodiment, the phonetic sequence acquirer 21 acquires a phonetic sequence and sends it to the feature converter 22. Then, the feature converter 22 generates, from the phonetic sequence, a phonetic sequence feature vector that represents a correct phonetic sequence used in the grapheme converter 23. The grapheme converter 23 uses the language model that is stored in the language DB 10 in the HDD 8; converts the phonetic sequence feature vector into graphemes; and outputs the graphemes.

Second Embodiment

Figure 5:
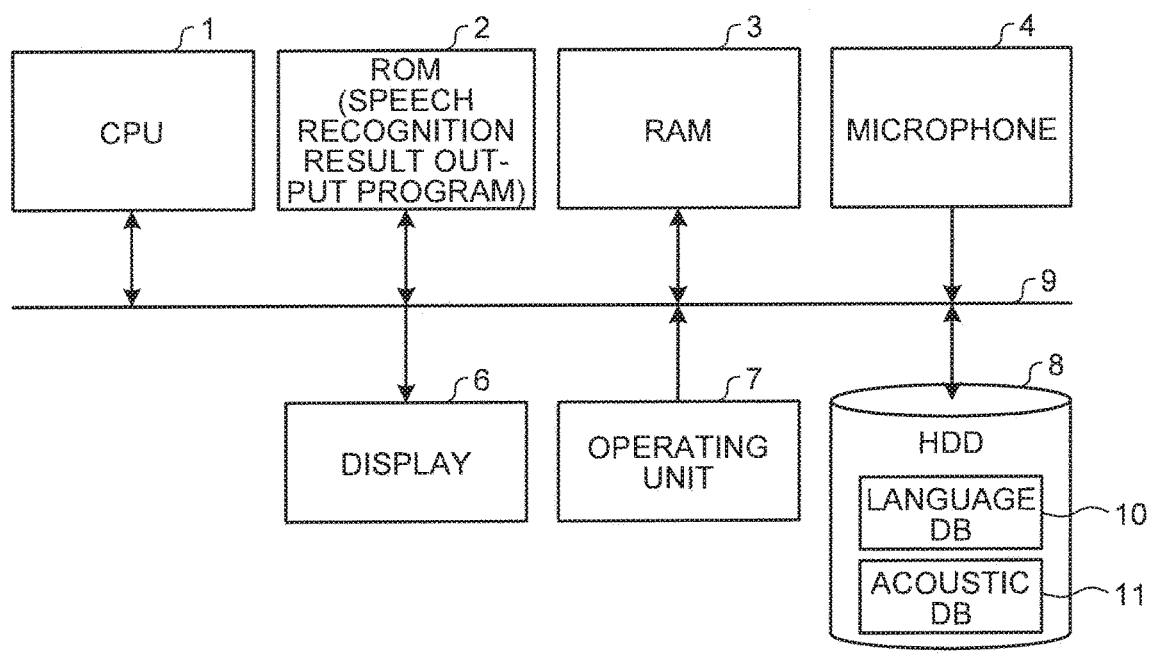
FIG. 5 is a hardware configuration diagram of a speech recognition result output device according to a second embodiment.

Given below is the explanation of a speech recognition result output device according to a second embodiment. FIG. 5 is a hardware configuration diagram of the speech recognition result output device according to the second embodiment. With reference to FIG. 5, the constituent elements performing the same operations as in the first embodiment are referred to by the same reference numerals, and explanation thereof is not repeated. As illustrated in FIG. 5, the speech recognition result output device according to the second embodiment includes the CPU 1, the ROM 2, the RAM 3, the microphone 4, the display 6, the operating unit and the HDD 8. The CPU 1 to the HDD 8 are connected to each other via the bus line 9.

The CPU 1 executes a speech recognition result output program stored in a storage such as the HDD 8, and performs a speech recognition result output operation (described later). The storage such as the HDD 8 is used to store the language DB 10 of the language model, as well as to store an acoustic DB 11 of an acoustic model that is formed by modeling the acoustic properties of phonetic sequences. The language DB 10 represents an example of a storage. The acoustic DB 11 is an example of another storage. Herein, the language DB 10 and the acoustic DB 11 can be physically installed in the same storage such as the HDD 8, or can be physically installed in different storages.

Figure 6:
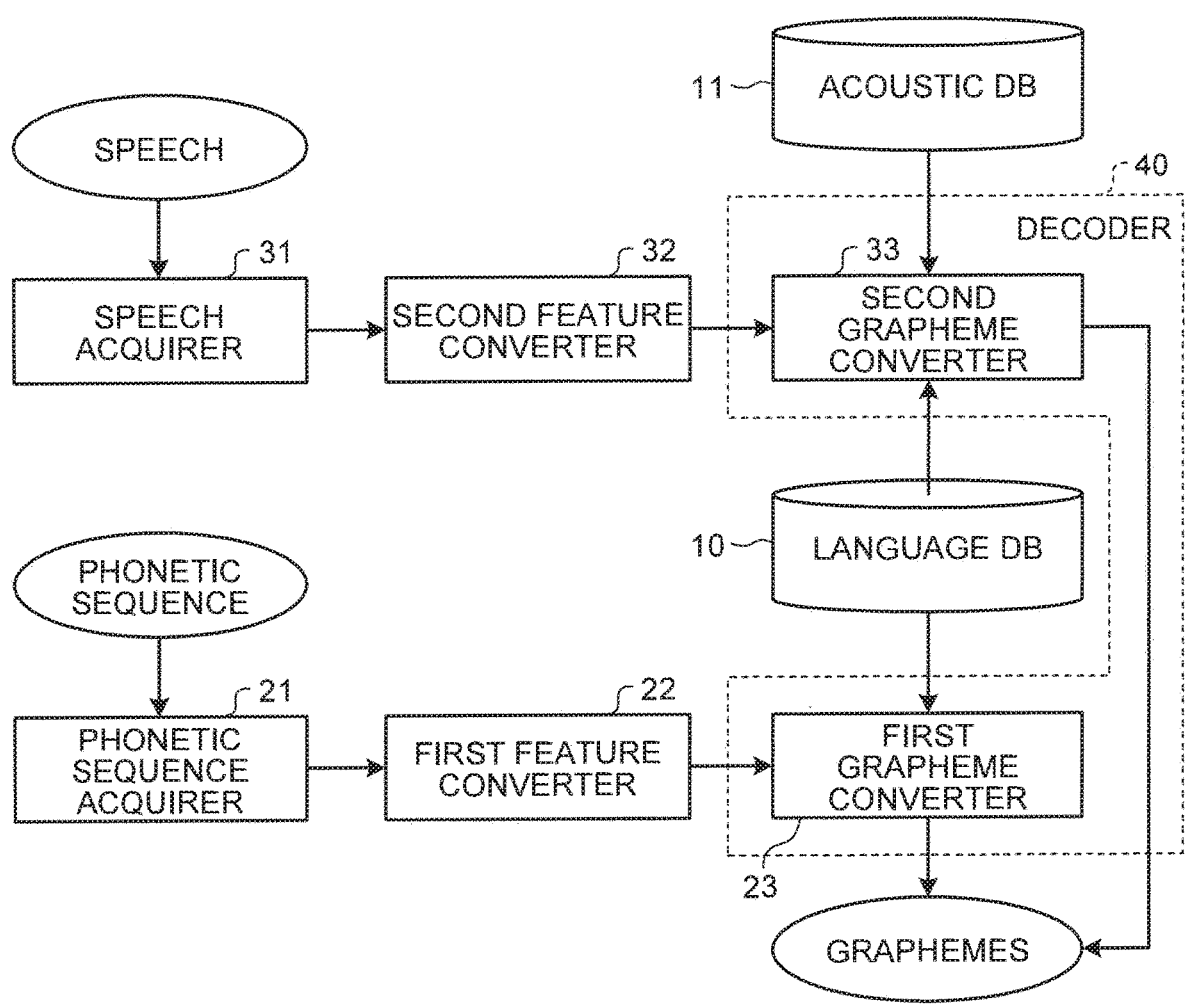
FIG. 6 is a functional block diagram of the entire speech recognition result output device according to the second embodiment.

FIG. 6 is a functional block diagram of the entire speech recognition result output device according to the second embodiment. As illustrated in FIG. 6, the speech recognition result output device according to the second embodiment includes a first grapheme converting system, which in turn includes the phonetic sequence acquirer 21, the feature converter 22 (hereinafter, "first feature converter 22"), the grapheme converter 23 hereinafter, "the first grapheme converter 23") as described above and which outputs graphemes corresponding to the acquired phonetic sequence; and includes a second grapheme converting system, which refers to the language DB 10 and the acoustic DB 11 stored in the HDD 8 and outputs graphemes corresponding to the acquired speech. That is, the speech recognition result output device according to the second embodiment includes the first grapheme converting system as well as includes the second grapheme converting system, which in turn includes a speech acquirer 31, a second feature converter 32, and a second grapheme converter 33.

The CPU 1 executes the speech recognition result output program stored in the ROM 2, and functions as the first grapheme converting system and the second grapheme converting system. Meanwhile, the first grapheme converter 23 and the second grapheme converter 33 constitute a decoder 40.

Herein, although the constituent elements 21 to 23 of the first grapheme converting system and the constituent elements 31 to 33 of the second grapheme converting system are assumed to be implemented using software, some or all of the constituent elements can be alternatively implemented using hardware such as an integrated circuit (IC). Meanwhile, the speech recognition result output program can be recorded as an installable file or an executable file in a computer-readable recording medium, which may be provided as a computer program product, such as a CD-ROM or a flexible disk (FD). Alternatively, the speech recognition result output program can be recorded in a computer-readable recording medium, which may be provided as a computer program product, such as a CD-R, a DVD, a Blu-ray Disc (registered trademark), or a semiconductor memory. Herein, DVD stands for Digital Versatile Disk. Still alternatively, the speech recognition result output program can be provided via a network such as the Internet. Then, the speech recognition result output program can be downloaded via the network, and can be installed in the speech recognition result output device or a personal computer device. Still alternatively, the speech recognition result output program can be stored in advance in an in-device ROM.

In the first grapheme converting system, the first feature converter 22 generates, from the phonetic sequence acquired by the phonetic sequence acquirer 21, a phonetic sequence feature vector that represents a correct phonetic sequence in the first grapheme converter 23 (=the decoder 40). Then, the first grapheme converter 23 uses the language model stored in the language DB 10; converts the phonetic sequence feature vector into grapheme; and outputs the graphemes.

In contrast, in the second grapheme converting system, the speech acquirer 31 sends the acquired speech to the second feature converter 32. Then, the second feature converter 32, which represents an example of another feature converter, converts the speech into a speech feature vector and sends the speech feature vector to the second grapheme converter 33. Then, the second grapheme converter 33, which represents an example of another grapheme converter, converts the speech feature vector into graphemes using the acoustic model stored in the acoustic DB 11 and the language model stored in the language DB 10, and outputs the graphemes.

FIG. 7 is a flowchart for explaining a sequence of operations during the speech recognition result output result performed by the first grapheme converting system and the second grapheme converting system. In the flowchart illustrated in FIG. 7, at Step S0, it is determined whether the input is a phonetic sequence or a speech. If the input is a phonetic sequence, in the first grapheme converting system, operations from Step S1 to Step S4 are performed. Herein, the operations from Step S1 to Step S4 are identical to the operations from Step S1 to Step 34 illustrated in flowchart in FIG. 3. Hence, regarding the operations from Step S1 to Step S4 illustrated in the flowchart in FIG. 7, the explanation of the flowchart illustrated in FIG. 3 may be referred to.

On the other hand, when the input is a speech, in the second phonetic sequence converting system, operations from Step S5 to Step S8 are performed. That is, at Step S5, the speech acquirer 31 acquires the input speech and sends it to the second feature converter 32. As an example, the microphone 4 illustrated in FIG. 5 represents the speech acquirer 31. The microphone 4 digitizes the collected analog speech using the analog-to-digital conversion function, and sends the digitized speech to the second feature converter 32.

Then, at Step S6, the second feature converter 32 converts the digitized speech into a speech feature vector. More particularly, the second feature converter 32 clips the speech waveform of the digitized speech into single frames at regular time intervals. Then, the second feature converter 32 calculates a frame-by-frame acoustic feature. That is, as an example, regarding the speech waveform of a digitized speech in which a single frame is made of 256 samples, the second feature converter 32 clips the speech waveform while shifting by 128 samples at a time.

The second feature converter 32 calculates a 12-dimensional MFCC feature from the speech waveform of a single frame representing clipped 256 samples. Herein, MFCC stands for Mel Frequency Cepstrum Coefficient. Then, the second feature converter 32 buffers the MFCC feature worth three frames. Then, the second feature converter 32 outputs a 36-dimensional feature that is formed by concatenating the buffered MFCC feature of three frames. Moreover, the second feature converter 32 outputs the 36-dimensional feature as the feature corresponding to the timing of the central frame from among the buffered three frames. In other words, as the feature corresponding to the timing of the central frame, the second feature converter 32 outputs the 36-dimensional feature of the central frame and the frames previous to and subsequent to the central frame.

Meanwhile, the feature to be extracted can be a feature other than the MFCC feature. For example, a mel-scale filter bank feature, a perceptual linear prediction (PLP), a RASTA-PLP feature, a pitch feature, and the Δ component and the ΔΔ component thereof can be used. Herein, RASTA stands for RelAtive SpecTral processing. Alternatively, it is possible to use a combination of the features mentioned above. Meanwhile, the number of concatenated frames is not limited to three, and any number of frames can be concatenated as Long as there is more than one frame. Moreover, the clipped sample size and the frame period are not limited to the values described above.

Subsequently, at Step S7, the second grapheme converter 33 uses the acoustic model stored in the acoustic DB 11 and the language model stored in the language DB 10, and converts the extracted speech feature vector into graphemes. The acoustic DB 11 is used to store an acoustic model of the deep neural network (DNN). Moreover, the language DB 10 is used to store a 1-gram language model. This language model is same as the language model used at the time of converting the phonetic sequence feature vector, which is generated by the first feature converter 22, into a phonetic sequence. The second grapheme converter 33 uses the acoustic model and the language model, and performs a general-purpose DNN-HMM speech recognition operation. The speech recognition operation is equivalent to the first grapheme converter except for the portion of converting a feature into an acoustic score vector using an acoustic model. Hence, the first grapheme converter and the second grapheme converter can share some functions of the decoder. Subsequently, at Step S8, as the speech recognition result, the second grapheme converter 33 outputs the graphemes acquired with respect to the input speech.

As is clear from the explanation given above, to the speech recognition result output device according to the second embodiment, the phonetic sequence acquirer 21 acquires a phonetic sequence and sends it to the first feature converter 22. Then, the first feature converter 22 generates, from the phonetic sequence, a phonetic sequence feature vector that represents a correct phonetic sequence in the grapheme converter 23 (FIG. 5: the decoder 40) disposed at the subsequent stage. The first grapheme converter 23 uses the language model stored in the language DB 10 of the HDD 8; converts the phonetic sequence feature vector into grapheme; and outputs the graphemes. As a result, the speech recognition result output device according to the second embodiment can be implemented in a simpler way using the decoder of an existing speech recognition engine as illustrated in FIG. 5 (i.e., by sharing the decoder functions).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A recognition result output device comprising:
first storage configured to store a language model for speech recognition;
second storage configured to store an acoustic model for speech recognition; and
processing circuitry coupled to the first storage and the second storage, and configured to function as a phonetic sequence acquirer, a first feature converter, a first grapheme converter, an input speech acquirer, a second feature converter, and a second graphene converter, wherein
the processing circuitry determines whether input is a phonetic sequence or a speech;
when the input is the phonetic sequence, the phonetic sequence acquirer acquires the phonetic sequence,
the first feature converter converts the phonetic sequence into a phonetic sequence feature vector, the phonetic sequence feature vector including a plurality of acoustic scores, each of the plurality of acoustic scores being an acoustic score of a phoneme included in the phonetic sequence,
the first grapheme converter converts the phonetic sequence feature vector into graphemes using the language model, and outputs the graphemes,
when the input is the speech, the input speech acquirer acquires the speech, the second feature converter converts a speech waveform of the acquired speech into a speech feature vector for speech recognition, the second grapheme converter converts the speech feature vector into graphemes using the language model and the acoustic model, and the recognition result output device further comprises a display configured to display the output graphemes.

2. The device according to claim 1, wherein the phonetic sequence feature vector is an acoustic score vector.

3. The device according to claim 1, wherein the phonetic sequence feature vector is a phoneme state acoustic score vector in which an element of a phoneme state acoustic score corresponding to a phonetic sequence in a phoneme state acoustic score vector sequence is set to be higher than other phoneme state acoustic scores.

4. The device according to claim 1, wherein the acoustic model is a Gaussian distribution acoustic model, and the phonetic sequence feature vector has average values of a plurality of dimensions of a mixture Gaussian acoustic model that represents a phonetic sequence state, as elements.

5. A recognition result output method employed in a recognition result output device comprising:

determining whether input is a phonetic sequence or a speech;

acquiring, when the input is the phonetic sequence, the phonetic sequence;

converting the acquired phonetic sequence into a phonetic sequence feature vector, the phonetic sequence feature vector including a plurality of acoustic scores, each of the plurality of acoustic scores being an acoustic score of a phoneme included in the phonetic sequence;

converting the phonetic sequence feature vector into graphemes using a language model that has language statistical information for speech recognition;

outputting the graphemes, acquiring, when the input is the speech, the speech;

converting a speech waveform of the acquired speech into a speech feature vector for speech recognition;

converting the speech feature vector into graphemes using the language model and an acoustic model, and displaying the output graphemes.

6. The method according to claim 5, wherein the phonetic sequence feature vector is an acoustic score vector.

7. The method according to claim 5, wherein the phonetic sequence feature vector is a phoneme state acoustic score vector in which an element of a phoneme state acoustic score corresponding to a phonetic sequence in a phoneme state acoustic score vector sequence is set to be higher than other phoneme state acoustic scores.

8. The method according to claim 5, wherein the acoustic model is a Gaussian distribution acoustic model, and the phonetic sequence feature vector has average values of a plurality of dimensions of a mixture Gaussian acoustic model that represents a phonetic sequence state, as elements.

9. A computer program product comprising a non-transitory computer-readable medium containing a program executed by a computer, the program causing the computer to execute:

determining whether input is a phonetic sequence or a speech;

acquiring, when the input is the phonetic sequence, the phonetic sequence;

converting the acquired phonetic sequence into a phonetic sequence feature vector, the phonetic sequence feature vector including a plurality of acoustic scores, each of the plurality of acoustic scores being an acoustic score of a phoneme included in the phonetic sequence;

converting the phonetic sequence feature vector into graphemes using a language model that has language statistical information for speech recognition; and outputting the graphemes, acquiring, when the input is the speech, the speech;

converting a speech waveform of the acquired speech into a speech feature vector for speech recognition;

converting the speech feature vector into graphemes using the language model and an acoustic model, and displaying the output graphemes.

10. The product according to claim 9, wherein the phonetic sequence feature vector is an acoustic score vector.

11. The product according to claim 9, wherein the phonetic sequence feature vector is a phoneme state acoustic score vector in which an element of a phoneme state acoustic score corresponding to a phonetic sequence in a phoneme state acoustic score vector sequence is set to be higher than other phoneme state acoustic scores.

12. The product according to claim 9, wherein the acoustic model is a Gaussian distribution acoustic model, and the phonetic sequence feature vector has average values of a plurality of dimensions of a mixture Gaussian acoustic model that represents a phonetic sequence state, as elements.

* * * * *